United States Patent
Osaki et al.

(10) Patent No.: US 9,868,160 B2
(45) Date of Patent: Jan. 16, 2018

(54) HARD-COATED CUTTING TOOL

(71) Applicant: UNION TOOL CO., Shinagawa, Tokyo (JP)

(72) Inventors: Hideki Osaki, Shinagawa-ku (JP); Shuntaro Suzuki, Shinagawa-ku (JP); Madoka Nitta, Shinagawa-ku (JP); Hidehito Watanabe, Shinagawa-ku (JP)

(73) Assignee: UNION TOOL CO., Shinagawa, Tokyo (JP)

( * ) Notice: Subject to any disclaimer, the term of this patent is extended or adjusted under 35 U.S.C. 154(b) by 673 days.

(21) Appl. No.: 14/507,294

(22) Filed: Oct. 6, 2014

(65) Prior Publication Data

US 2015/0117972 A1    Apr. 30, 2015

(30) Foreign Application Priority Data

Oct. 31, 2013 (JP) ................................. 2013-226984

(51) Int. Cl.
 B23C 5/00 (2006.01)
 B23C 5/10 (2006.01)
(52) U.S. Cl.
 CPC ...... *B23C 5/1009* (2013.01); *B23B 2228/105* (2013.01); *B23C 2210/126* (2013.01);
 (Continued)
(58) Field of Classification Search
 CPC ............. B23B 228/10; B23B 228/105; B23B 2224/00; B23B 2226/125;
 (Continued)

(56) References Cited

U.S. PATENT DOCUMENTS 4,527,643 A * 7/1985 Horton .................. E21B 10/567
 175/420.2
4,671,710 A * 6/1987 Araki ....................... B23B 51/02
 408/145

(Continued)

FOREIGN PATENT DOCUMENTS

CN       102821896 A    12/2012
DE    102011076584 A1    11/2012
(Continued)

OTHER PUBLICATIONS

Communication dated Jun. 3, 2016, from the State Intellectual Property Office of People's Republic of China in counterpart application No. 201410599081.1.

(Continued)

*Primary Examiner* — Will Fridie, Jr.
(74) *Attorney, Agent, or Firm* — Sughrue Mion, PLLC

(57) ABSTRACT

The present invention provides a more practical hard-coated cutting tool having improved cutting performance during finishing so as to obtain a better finished surface. Provided is a hard-coated cutting tool including a tool body (7) coated with a hard coating (4) and having a cutting edge (3) formed on a ridge line intersecting a flank face (1) and a rake face (2). In the hard-coated cutting tool, the thickness h1 of the hard coating (4) on the flank face (1) side and the thickness h2 of the hard coating (4) on the rake face (2) side near the cutting edge (3) satisfies conditions 8 µm≤h1≤30 µm and 0≤h2/h1≤0.5 in a cross-section perpendicular to the cutting edge (3) in a range equal to or less than 0.3 times the tool diameter in the axial direction from the tip of the tool.

17 Claims, 13 Drawing Sheets

(52) U.S. Cl.
CPC ...... *B23C 2226/31* (2013.01); *B23C 2228/04* (2013.01); *B23C 2228/10* (2013.01); *Y10T 407/24* (2015.01)

(58) Field of Classification Search
CPC .......... B23B 2226/315; B23B 2240/00; B23B 2251/50; B23B 27/141; E21B 10/5676; E21B 10/567; B23C 30/005
See application file for complete search history.

(56) References Cited

U.S. PATENT DOCUMENTS

| | | | | |
|---|---|---|---|---|
| 5,195,404 | A * | 3/1993 | Notter | B23B 51/02 407/118 |
| 5,232,320 | A * | 8/1993 | Tank | B23B 51/00 407/118 |
| 5,379,853 | A * | 1/1995 | Lockwood | E21B 10/5673 175/428 |
| 5,443,337 | A * | 8/1995 | Katayama | B23B 27/146 407/118 |
| 5,499,688 | A * | 3/1996 | Dennis | E21B 10/5673 175/426 |
| 7,517,589 | B2 * | 4/2009 | Eyre | C22C 26/00 407/119 |
| 7,585,342 | B2 * | 9/2009 | Cho | B23B 51/02 51/293 |
| 8,176,825 | B1 * | 5/2012 | Isaacson | B23C 5/1081 175/435 |
| 8,899,356 | B2 * | 12/2014 | Myers | E21B 10/58 175/412 |
| 9,394,747 | B2 * | 7/2016 | Bellin | E21B 10/5735 |
| 2007/0166545 | A1 * | 7/2007 | Tanibuchi | B23B 27/141 428/408 |
| 2008/0193724 | A1 * | 8/2008 | Okamura | B23B 27/141 428/192 |
| 2009/0067938 | A1 * | 3/2009 | Omori | B23B 27/141 407/119 |
| 2009/0097933 | A1 * | 4/2009 | Omori | B23B 27/141 408/227 |
| 2009/0269150 | A1 * | 10/2009 | Omori | B23B 27/141 407/114 |
| 2010/0040423 | A1 * | 2/2010 | Omori | B23B 27/141 407/119 |
| 2010/0196109 | A1 * | 8/2010 | Shi | B23B 51/00 408/144 |
| 2015/0117972 | A1 * | 4/2015 | Osaki | B23C 5/1009 407/115 |
| 2017/0021434 | A1 * | 1/2017 | Kauper | B23C 5/16 |
| 2017/0072474 | A1 * | 3/2017 | Minami | B23B 27/141 |

FOREIGN PATENT DOCUMENTS

| | | |
|---|---|---|
| EP | 1952920 A1 | 8/2008 |
| JP | 2002-370106 A | 12/2002 |
| JP | 2003-025117 A | 1/2003 |
| JP | 2004-122263 A | 4/2004 |
| JP | 2007168063 A | 7/2007 |
| JP | 2011-5582 A | 1/2011 |
| JP | 20115582 A | 1/2011 |
| JP | 2011-101910 A | 5/2011 |
| JP | 2012-176471 A | 9/2012 |
| WO | 2007058065 A1 | 5/2007 |

OTHER PUBLICATIONS

Communication dated Jun. 27, 2016, issued by Korean Intellectual Property Office in corresponding Korean Application No. 10-2014-0148403.
Communication dated Mar. 16, 2015 from the European Patent Office in counterpart application No. 14188129.2.
Communication dated Feb. 12, 2015 from the Japanese Patent Office in counterpart application No. 2013-226984.

* cited by examiner

FIG.7
(a)　　　　　　　　(b)
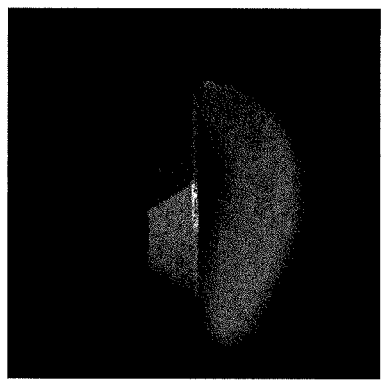 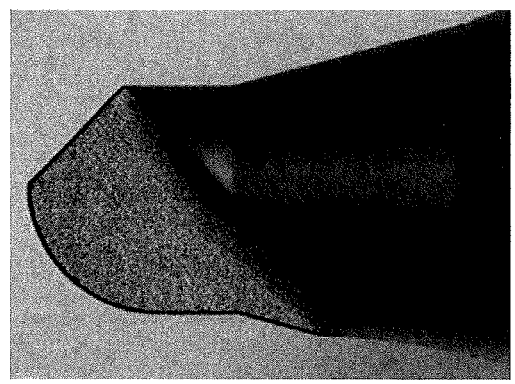

FIG.8
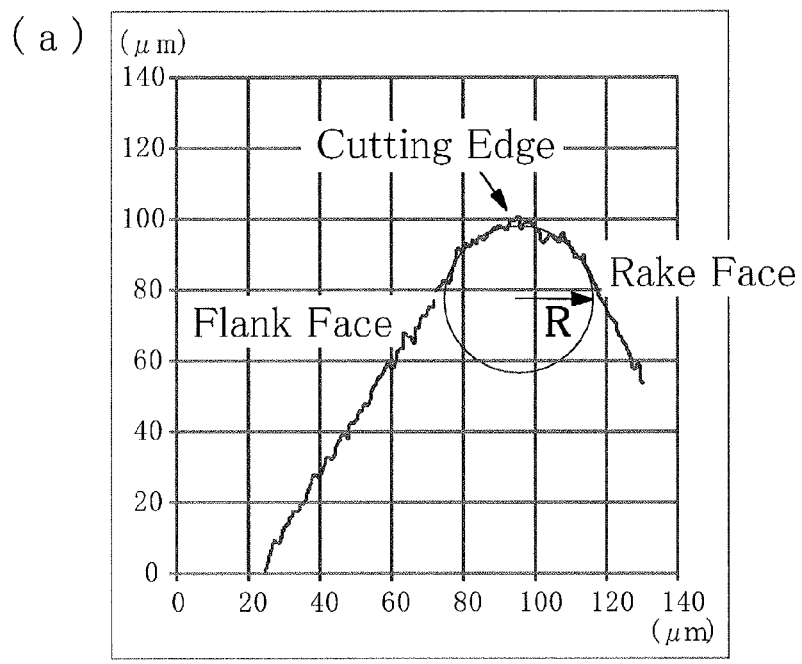
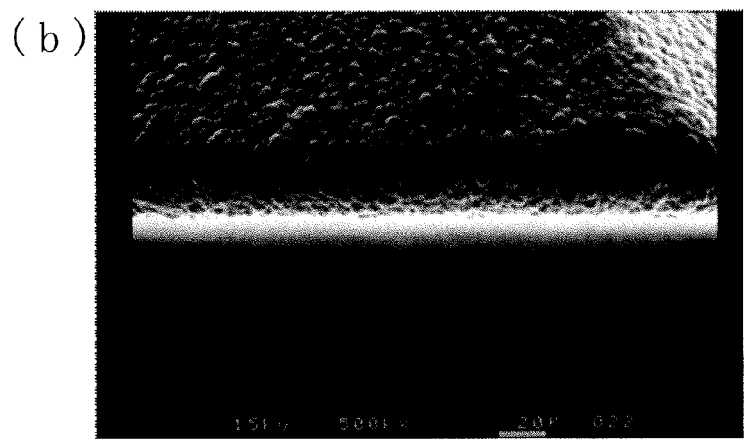
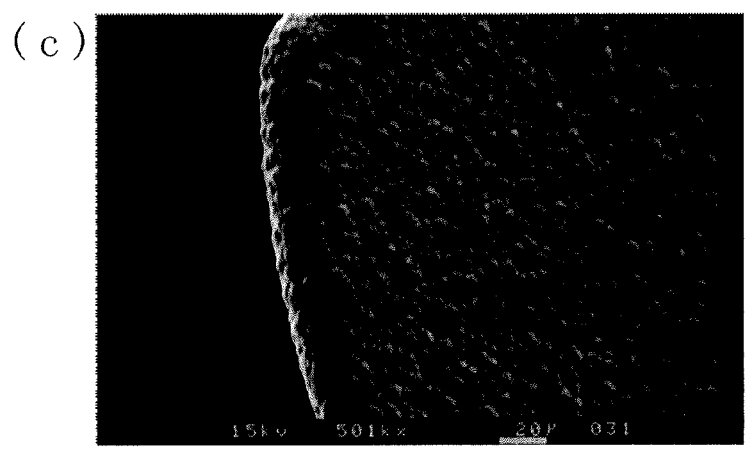

FIG.9
(a)
(b)
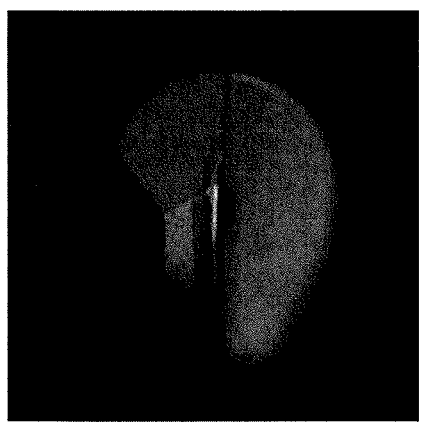
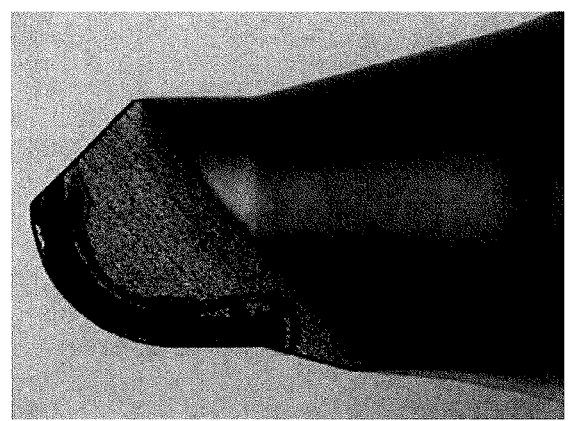

FIG.10
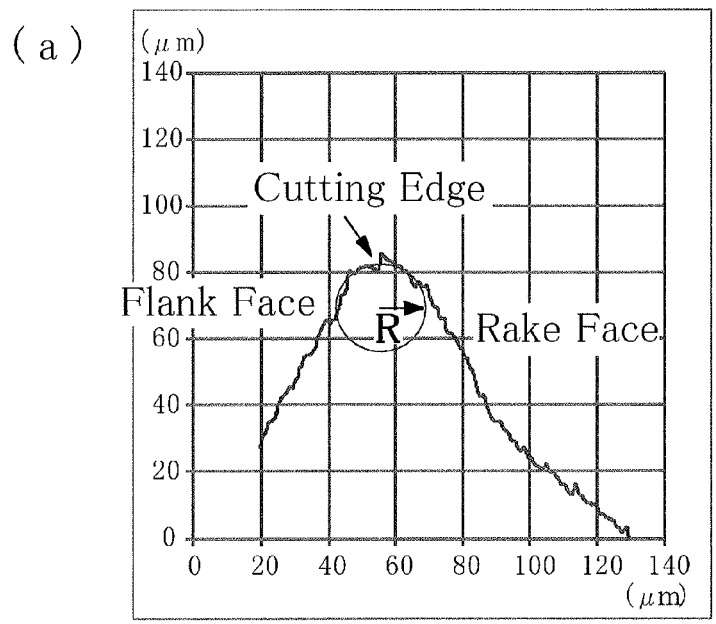
(a)
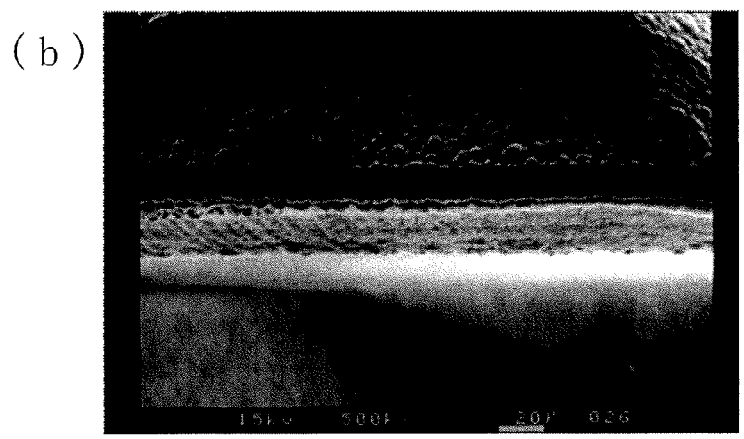
(b)
(c)

FIG.12 ( sheet 1 )

| Example No. | Coating Thickness on Flank Face h1 (μm) | Coating Thickness on Rake Face h2 (μm) | Coating Removed on Rake Face (Yes, No) | h2/h1 | Radius R of Cutting Edge (μm) | R/h1 | Lifespan (Units) | 1st Pocket Chipping (μm) | Chipping Evaluation | Peeled Coating on Rake Face | Overall Evaluation |
|---|---|---|---|---|---|---|---|---|---|---|---|
| 1 | 5 | 0 | Yes | 0 | 0.5 | 0.1 | 1 | 4 | ○ | ◎ | × |
| 2 | 5 | 1.25 | Yes | 0.25 | 2 | 0.4 | 1 | 4 | ○ | ○ | × |
| 3 | 5 | 2.5 | Yes | 0.5 | 3 | 0.6 | 1 | 4 | ○ | ○ | × |
| 4 | 5 | 4 | Yes | 0.8 | 6 | 1.2 | 1 | 6 | ○ | × | × |
| 5 | 8 | 0 | Yes | 0 | 0.7 | 0.0875 | 2 | 3 | ○ | ◎ | ○ |
| 6 | 8 | 1 | Yes | 0.125 | 1 | 0.125 | 2 | 4 | ○ | ◎ | ○ |
| 7 | 8 | 2 | Yes | 0.25 | 4 | 0.5 | 3 | 4 | ○ | ○ | ○ |
| 8 | 8 | 4 | Yes | 0.5 | 8 | 1 | 3 | 5 | ○ | ○ | ○ |
| 9 | 8 | 6 | Yes | 0.75 | 10 | 1.25 | 4 | 6 | ○ | × | × |
| 10 | 15 | 0 | Yes | 0 | 7 | 0.46667 | 4 | 5 | ○ | ◎ | ◎ |
| 11 | 15 | 3.75 | Yes | 0.25 | 10 | 0.66667 | 5 | 7 | ○ | ○ | ◎ |
| 12 | 15 | 7.5 | Yes | 0.5 | 11 | 0.73333 | 6 | 10 | ○ | ○ | ◎ |

FIG.12 (sheet 2)

| Example No. | Coating Thickness on Flank Face h1 (μm) | Coating Thickness on Rake Face h2 (μm) | Coating Removed on Rake Face (Yes, No) | h2/h1 | Radius R of Cutting Edge (μm) | R/h1 | Lifespan (Units) | 1st Pocket Chipping (μm) | Chipping Evaluation | Peeled Coating on Rake Face | Overall Evaluation |
|---|---|---|---|---|---|---|---|---|---|---|---|
| 13 | 15 | 12 | Yes | 0.8 | 15 | 1 | 7 | 18 | △ | × | × |
| 14 | 19 | 8 | Yes | 0.421053 | 12 | 0.63158 | 6 | 10 | ○ | ○ | ◎ |
| 15 | 19 | 18 | No | 0.947368 | 20 | 1.05263 | 5 | 38 | × | × | × |
| 16 | 30 | 0 | Yes | 0 | 12 | 0.4 | 4 | 10 | ○ | ◎ | ◎ |
| 17 | 30 | 7.5 | Yes | 0.25 | 15 | 0.5 | 6 | 13 | △ | ○ | ○ |
| 18 | 30 | 15 | Yes | 0.5 | 17 | 0.56667 | 7 | 19 | △ | ○ | ○ |
| 19 | 30 | 21 | Yes | 0.7 | 23 | 0.76667 | 5 | 42 | × | × | × |
| 20 | 35 | 0 | Yes | 0 | 15 | 0.42857 | 2 | 60 | × | ◎ | × |
| 21 | 40 | 0 | Yes | 0 | 18 | 0.45 | 2 | 65 | × | ◎ | × |
| 22 | 40 | 10 | Yes | 0.25 | 20 | 0.5 | 0 | — | × | × | × |
| 23 | 40 | 20 | Yes | 0.5 | 25 | 0.625 | 0 | — | × | × | × |
| 24 | 40 | 24 | Yes | 0.6 | 29 | 0.725 | 0 | — | × | × | × |

FIG.13

| Angle (°) | Angle (°) with respect to the cut blade right angle (90°) | Shavings discharge |
|---|---|---|
| 120 | 30 | × |
| 110 | 20 | △ |
| 100 | 10 | ○ |
| 90 | 0 | ○ |
| 80 | −10 | ○ |
| 70 | −20 | △ |
| 60 | −30 | × |
| 50 | −40 | × |

○: Good, △: Fair, ×: Poor

FIG.14

| Arrangement Interval α (μm) | Sharpness of Cutting Edge | Shavings discharge |
|---|---|---|
| 50 | × | ○ |
| 40 | △ | ○ |
| 30 | ○ | ○ |
| 10 | ○ | ○ |
| 5 | ○ | ○ |
| 1 | ○ | ○ |
| 0.8 | ○ | △ |
| 0.5 | ○ | × |

○: Good, △: Fair, ×: Poor

HARD-COATED CUTTING TOOL

TECHNICAL FIELD

The present invention relates to a hard-coated cutting tool.

BACKGROUND ART

As disclosed in Patent Document 1, various hard-coated cutting tools have been proposed. These rotary cutting tools are coated with a hard coating such as a diamond coating to improve their wear resistance. In recent years, there has been increasing market demand for cutting tools able to cut hard and brittle materials that are difficult to cut such as glass, ceramics and cemented carbide, and many cutting tool manufacturers have been conducting research and development on cutting tools that are able to meet this market demand. In particular, they have been researching and developing cutting tools that typically use super-strong, super-hard cemented carbides as the tool base material, which are coated with a hard coating such as a diamond coating or a nitride-based coating.

PRIOR ART DOCUMENTS

Patent Documents

[Patent Document 1] Japanese Laid-open Patent Publication No. 2003-25117

DISCLOSURE OF THE INVENTION

Problems to be Solved by the Invention

These hard and brittle materials are very hard and very fragile, and are very difficult to cut without chipping. Because the cutting edge on these hard-coated cutting tools is more rounded due to the thickness of the coating compared to the cutting edge of a tool not coated with a hard coating, good cutting action is not obtainable during cutting. When a hard and brittle material is cut using one of these cutting tools, the cutting edge is especially vulnerable to chipping (known as "edge chipping"; see FIG. 1) at the ends of the cut material.

In addition, the hard coating often peels off. When a cutting tool continues to be used after peeling has occurred near the cutting edge, a step may develop in the level of the finished surface on the cut material before and after the peeling, and a change occurs in finishing quality.

Therefore, it is an object of the present invention to solve these problems by providing a more practical hard-coated cutting tool with improved cutting performance during finishing that results in a better finished surface. This improved cutting performance is achieved by establishing the proper thickness for the hard coating on the rake surface of the hard-coated cutting tool, which both produces a cutting edge with the desired sharpness, and inhibits peeling of the coating near the cutting edge during finishing.

Means of Solving the Problems

The following is a description of the present invention with reference to the accompanying drawings.

The present invention relates to a hard-coated cutting tool including a tool body 7 coated with a hard coating 4 and having a cutting edge 3 formed on a ridge line intersecting a flank face 1 and a rake face 2, the hard-coated cutting tool characterized in that the thickness $h_1$ of the hard coating 4 on the flank face 1 side and the thickness $h_2$ of the hard coating 4 on the rake face 2 side near the cutting edge 3 satisfies the following two conditions in a cross-section perpendicular to the cutting edge 3 in a range equal to or less than 0.3 times the tool diameter in the axial direction from the tip of the tool.

$$8\ \mu m \leq h_1 \leq 30\ \mu m \tag{1}$$

$$0 \leq h_2/h_1 \leq 0.5 \tag{2}$$

In the hard-coated cutting tool according to the first aspect, the following condition is satisfied when the roundness of the edge of the cutting edge 3 is approximated by a circular arc having radius R in the direction perpendicular to the cutting edge 3 in a range equal to or less than 0.3 times the tool diameter in the axial direction from the tip of the tool.

$$0.1 h_1 \leq R \leq 0.8 h_1$$

Also, in the hard-coated cutting tool according to the first aspect, the following condition is satisfied when the roundness of the edge of the cutting edge 3 is approximated by a circular arc having radius R in the direction perpendicular to the cutting edge 3 in a range equal to or less than 0.3 times the tool diameter in the axial direction from the tip of the tool.

$$0.1 h_1 \leq R \leq 15\ \mu m$$

Also, in the hard-coated cutting tool according to the first aspect, a plurality of fine ridges 6 intersecting the cutting edge 3 at an angle in a range of 90°±20° are arranged in parallel in the hard coating 4 of the rake face 2 at least in a region adjacent to the cutting edge 3 within a range equal to or less than 0.3 times the tool diameter in the axial direction from the tip of the tool.

Also, in the hard-coated cutting tool according to the second aspect, a plurality of fine ridges 6 intersecting the cutting edge 3 at an angle in a range of 90°±20° are arranged in parallel in the hard coating 4 of the rake face 2 at least in a region adjacent to the cutting edge 3 within a range equal to or less than 0.3 times the tool diameter in the axial direction from the tip of the tool.

Also, in the hard-coated cutting tool according to the third aspect, a plurality of fine ridges 6 intersecting the cutting edge 3 at an angle in a range of 90°±20° are arranged in parallel in the hard coating 4 of the rake face 2 at least in a region adjacent to the cutting edge 3 within a range equal to or less than 0.3 times the tool diameter in the axial direction from the tip of the tool.

Also, in the hard-coated cutting tool according to the fourth aspect, the interval between the ridges 6 arranged in parallel is from 1 μm to 30 μm.

Also, in the hard-coated cutting tool according to the fifth aspect, the interval between the ridges 6 arranged in parallel is from 1 μm to 30 μm.

Also, in the hard-coated cutting tool according to the sixth aspect, the interval between the ridges 6 arranged in parallel is from 1 μm to 30 μm.

Also, in the hard-coated cutting tool according to the seventh aspect, the arithmetic mean roughness Ra of the portion including the ridges 6 arranged in parallel is from 0.05 μm to 1 μm.

Also, in the hard-coated cutting tool according to the eighth aspect, the arithmetic mean roughness Ra of the portion including the ridges 6 arranged in parallel is from 0.05 μm to 1 μm.

Also, in the hard-coated cutting tool according to the ninth aspect, the arithmetic mean roughness Ra of the portion including the ridges 6 arranged in parallel is from 0.05 μm to 1 μm.

Also, in the hard-coated cutting tool according to the tenth aspect, the ridges 6 are formed when a portion of the surface of the hard coating 4 on the rake face 2 adjacent to the cutting edge 3 is removed using a laser.

Also, in the hard-coated cutting tool according to the eleventh aspect, the ridges 6 are formed when a portion of the surface of the hard coating 4 on the rake face 2 adjacent to the cutting edge 3 is removed using a laser.

Also, in the hard-coated cutting tool according to the twelfth aspect, the ridges 6 are formed when a portion of the surface of the hard coating 4 on the rake face 2 adjacent to the cutting edge 3 is removed using a laser.

Also, in the hard-coated cutting tool according to the thirteenth aspect, the hard coating 4 is a diamond coating 4.

Also, in the hard-coated cutting tool according to the fourteenth aspect, the hard coating 4 is a diamond coating 4.

Also, in the hard-coated cutting tool according to the fifteenth aspect, the hard coating 4 is a diamond coating 4.

Effect of the Invention

Because of the configuration described above, the present invention is a more practical hard-coated cutting tool with improved cutting performance during finishing that is able to obtain a better finished surface.

BRIEF DESCRIPTION OF THE DRAWINGS

FIG. 7 shows (a) a front surface photograph and (b) a side surface photograph of a comparative example.

FIG. 8 shows (a) measurement data for the radius R of the roundness of the cutting edge in the comparative example, (b) a photograph of the coating from the cutting edge side (the direction in which the flank face is substantially parallel to the rake face), and (c) a photograph of the coating from the rake face side.

FIG. 9 shows (a) a front surface photograph and (b) a side surface photograph of a test example.

FIG. 10 shows (a) measurement data for the radius R of the roundness of the cutting edge in the test example, (b) a photograph of the coating from the cutting edge side (the direction in which the flank face is substantially parallel to the rake face), and (c) a photograph of the coating from the rake face side.

FIG. 12 is a table showing test conditions and test results.

FIG. 13 is a table showing test conditions and test results.

FIG. 14 is a table showing test conditions and test results.

BEST MODE FOR CARRYING OUT THE INVENTION

The following is a simplified explanation with reference to the drawings of a preferred embodiment of the present invention showing the effects of the present invention.

By making the thickness of the hard coating 4 on the rake face 2 near the cutting edge 3 a predetermined thickness that is equal to or less than half of the thickness of the hard coating 4 on the flank face 1, the roundness of the cutting edge due to the hard coating 4 can be inhibited to obtain the desired sharpness. In other words, when the roundness of the edge of the cutting edge is approximated by a circular arc having radius R in the direction perpendicular to the cutting edge 3, the radius R can be reduced sufficiently, and chipping can be inhibited.

Because a thinner hard coating 4 is less likely to peel, peeling of the hard coating 4 on the rake face 2 side can be inhibited. In other words, peeling of the hard coating 4 near the cutting edge 3 can be inhibited during finishing. Therefore, a difference does not develop in the level of the finished surface during processing, and a change in processing quality can be prevented.

Embodiment

The following is a description of a specific embodiment of the present invention with reference to the drawings.

Figure 3:
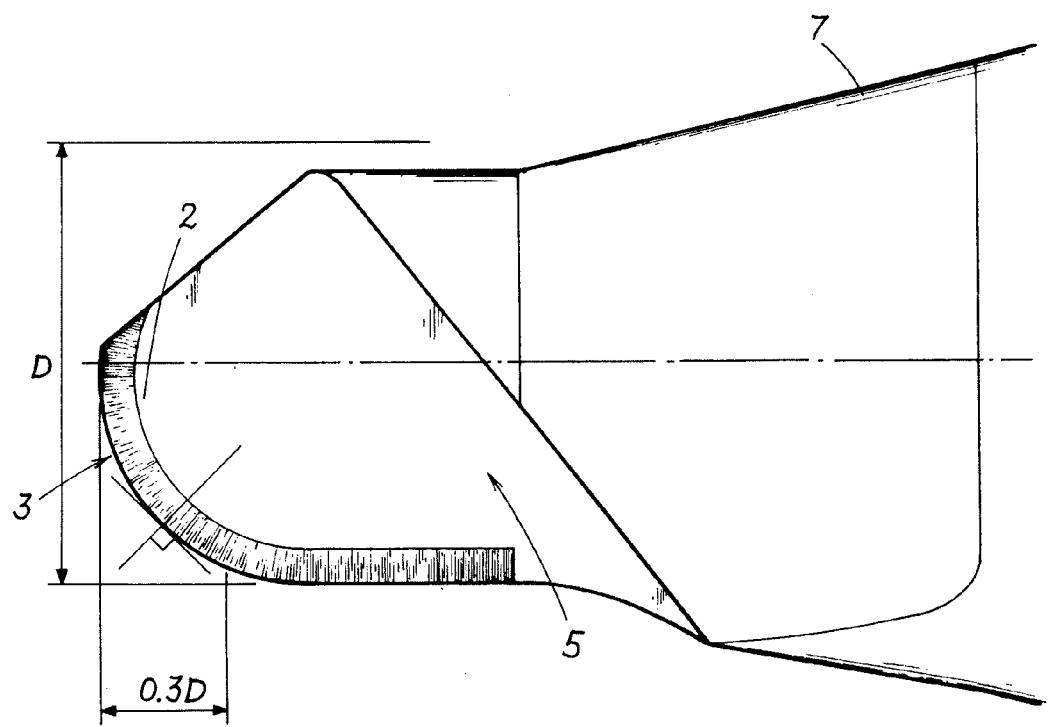
FIG. 3 is a side view used to illustrate the embodiment of the present invention.

The present embodiment is a hard-coated cutting tool including a tool body 7 coated with a hard coating 4 and having a cutting edge 3 formed on a ridge line intersecting a flank face 1 and a rake face 2. In this hard-coated cutting tool, as shown in FIG. 3, the thickness h1 of the hard coating 4 on the flank face 1 side and the thickness h2 of the hard coating 4 on the rake face 2 side near the cutting edge 3 satisfies the conditions 8 μm≤h1≤30 μm and 0≤h2/h1≤0.5 in a cross-section perpendicular to the cutting edge 3 in a range equal to or less than 0.3 times (0.3 D) the tool diameter (rotational diameter of the blade portion) D in the axial direction from the tip of the tool.

Figure 2:
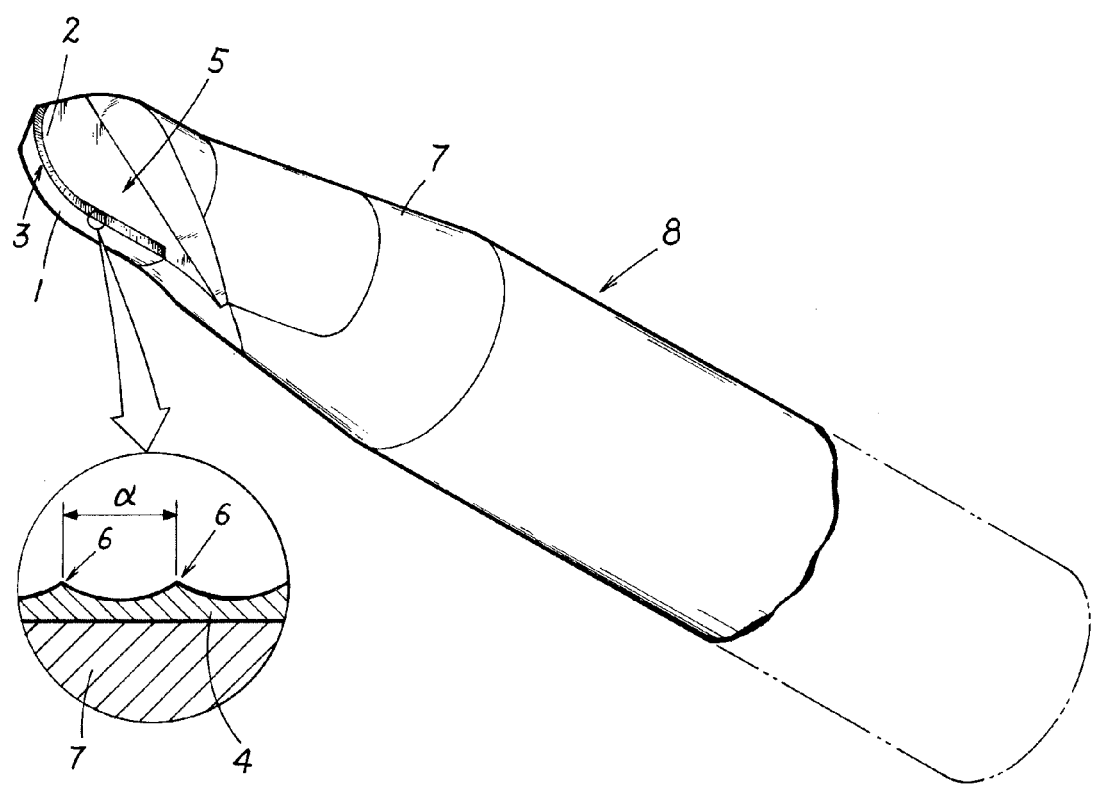
FIG. 2 shows a perspective view and an enlarged partial view of the essential components used to illustrate an embodiment of the present invention.

The present embodiment is a ball end mill with a single, so-called straight blade (no spiral shape around the tool axis) having a shavings discharge groove 5 parallel to the tool axis as shown in FIG. 2. More specifically, the tool body 7 is made of cemented carbide, a shavings discharge groove 5 is provided parallel to the tool axis on the outer periphery, and a cutting edge 3 is provided at the tip of the tool body 7 on a ridge line intersecting the flank face 1 and the rake face 2 of the shavings discharge groove 5. In the drawing, numeral 8 is the shank portion.

The tool body 7 is coated with a diamond coating 4. A hard coating other than a diamond coating may also be used.

Figure 4:
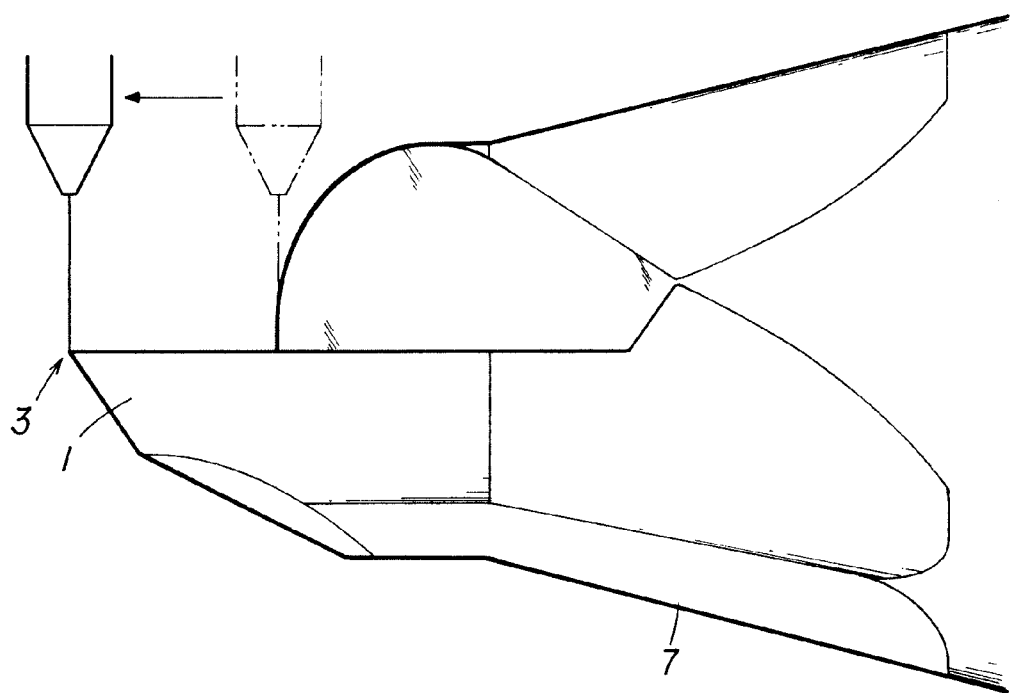
FIG. 4 is a diagram used to illustrate the laser irradiation method in the embodiment of the present invention.
Figure 5:
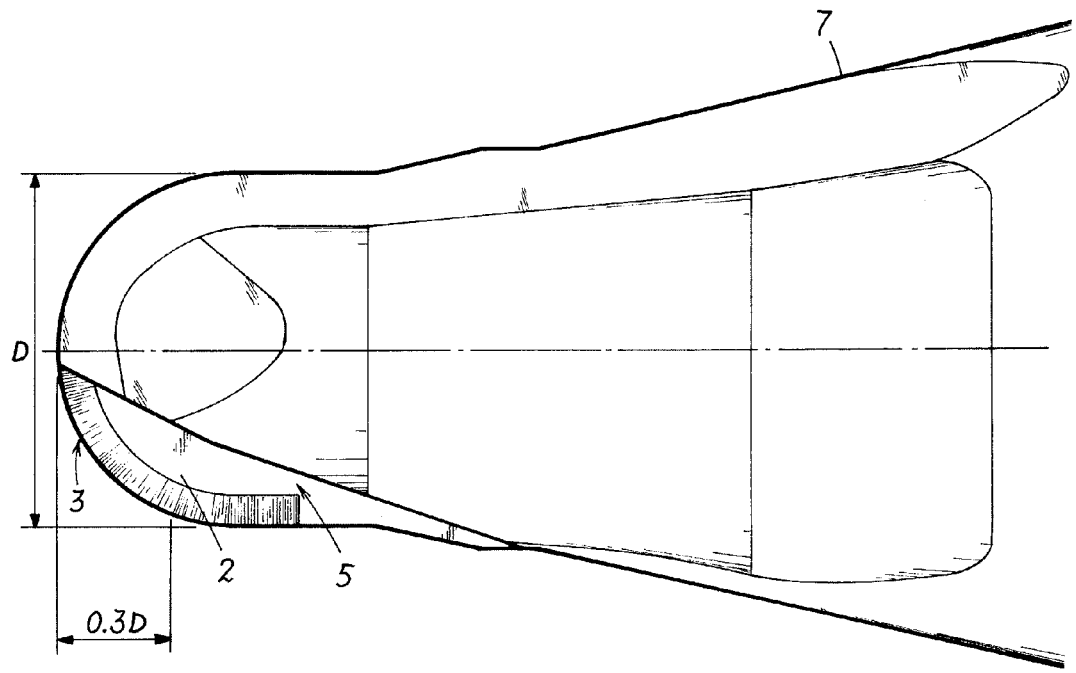
FIG. 5 is a side view used to illustrate another embodiment of the present invention.

The tool body 7 is coated uniformly with the diamond coating 4 using the CVD method, and a portion of the surface is partially removed using a laser so that the diamond coating 4 on the rake face 2 near the cutting edge 3 is the desired thickness. In the present embodiment, a $YVO_4$ laser is moved parallel to the surface of the diamond coating 4 above the rake face 2 (front of the rake face 2) as shown in FIG. 4, and the surface is irradiated at a predetermined feed rate and output to remove a portion of the diamond coating 4. It may also be removed using a grinding wheel. In another configuration, the rake faces 2 of both cutting edges 3 of the ball end mill with two straight blades shown in FIG. 5 are processed in the same way to achieve similar results. The blades do not have to be straight blades. A so-called threaded blade with a shavings discharge groove 5 formed in a spiral shape around the tool axis can also be used.

Figure 6:
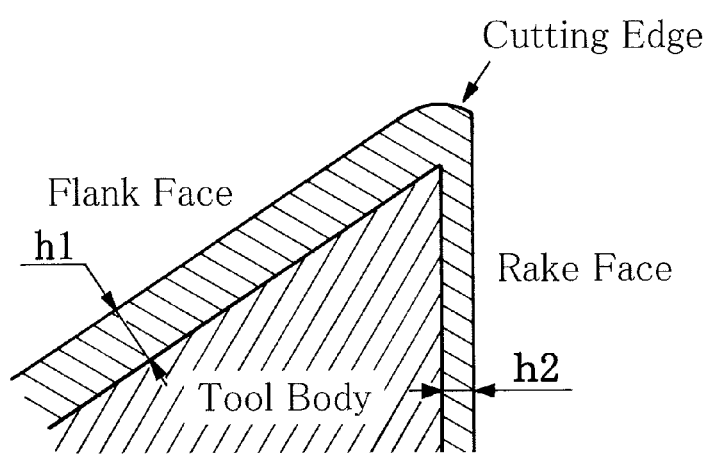
FIG. 6 is a view used to illustrate the essential components in the embodiment of the present invention.

The diamond coating 4 on the rake face 2 side is removed so that, as mentioned above, the thickness h1 of the diamond coating 4 on the flank face 1 side and the thickness h2 of the diamond coating 4 on the rake face 2 side near the cutting edge 3 satisfies the conditions 8 μm≤h1≤30 μm and 0≤h2/h1≤0.5 in a cross-section perpendicular to the cutting edge 3 in a range equal to or less than 0.3 times the tool diameter in the axial direction from the tip of the tool, that is, so that the diamond coating 4 on the rake face 2 side is thinner than the diamond coating 4 on the flank face 1 side. More specifically, laser irradiation is repeated at a predetermined interval in the direction along the cutting edge 3 to remove a portion of the diamond coating 4 on the rake face 2 side within a predetermined range (see FIG. 6).

If the process of removing a portion of the diamond coating 4 on the rake face 2 side is not performed within the region prescribed for partial removal of the diamond coating 4, the effects of the present invention cannot be obtained. Therefore, it must be performed towards the back end from the tip of the cutting edge 3 over at least one-tenth of the tool diameter (performed to a width of one-tenth of the tool diameter). In the present embodiment, a width of 0.1 mm, or one-tenth of the tool diameter of 1 mm, is removed.

Rotary cutting tools coated with a diamond coating 4 are often coated from the tip in the axial direction in a range up to 0.3 times the tool diameter. Therefore, h1 and h2 should satisfy the settings mentioned above at least in this range.

In the case of a rotary cutting tool coated with a diamond coating 4, the tool life is dependent on the thickness h1 of the coating on the flank face 1. Therefore, when the thickness h1 of the coating on the flank face 1 is less than 8 μm as viewed in cross-section perpendicular to the cutting edge 3, coating wear is rapid, the tool life tends to be much shorter, and processing is difficult to continue. When the thickness exceeds 30 μm, it is difficult to ensure that the diamond coating 4, which by nature does not adhere well to a cemented carbide base material, will adhere to the tool body 7. This increases the risk of peeling, and stable tool life is difficult to obtain.

The thickness h2 of the coating on the rake face 2 in relation to the thickness h1 of the coating on the flank face 1 determines the degree of edge roundness. Because a thick diamond coating 4 on the rake face 2 side also dramatically increases the risk of peeling, the condition 0≤h2/h1≤0.5 should also be satisfied. In other words, the thickness h2 of the coating on the rake face 2 should be equal to or less than half the thickness h1 of the coating on the flank face 1.

In addition, the condition 0.1h1≤R≤0.8h1 (0.1≤R/h1≤0.8) is established when the roundness of the edge of the cutting edge 3 is approximated by a circular arc having radius R in the direction perpendicular to the cutting edge 3 in a range equal to or less than 0.3 times the tool diameter in the axial direction from the tip of the tool (when the radius R of the cutting edge is measured).

The size of the radius R of a cutting edge coated with a diamond coating 4 is determined largely by the relationship between the thickness of the diamond coating 4 on the flank face 1 side and the thickness of the diamond coating 4 on the rake face 2 side.

Generally, the radius R of the cutting blade obtained by removing and thinning the diamond coating 4 on the rake face 2 side is likely to cause chipping of the edge during cutting when the size of the radius R is less than 0.1 h1 (R/h1 is less than 0.1). Because edge chipping on the cut material becomes a greater concern when the radius R of the cutting edge is larger, the radius R of the cutting edge is preferably 0.8 h1 or less (R/h1≤0.8) or 15 μm or less, when the radius R of the cutting edge has been increased by a thicker coating on the flank face 1 side. When the diamond coating 4 has been completely removed on the rake face 2 side (h2/h1=0), the size of the radius R of the cutting edge becomes smaller, the cutting edge becomes sharper, and cutting performance is improved. However, the likelihood of the diamond coating 3 peeling off the flank face 1 side is reduced and the strength of the diamond coating 4 near the cutting edge can be maintained when some of the diamond coating 4 is left on the rake face 2. Therefore, some of the diamond coating should remain. Preferably, the condition 0≤h2/h1≤0.2 is satisfied.

The diamond coating 4 on the rake face 2 side was removed using the method described above to change the ratio (h2/h1) of the thickness h1 of the coating on the flank face 1 to the thickness h2 of the rake face 2, and the effect was observed. The test results are shown in FIG. 12.

In the present embodiment, the radius R of the cutting edge was measured using a non-contact three-dimensional measuring device (NH-3SP) from Mitaka Optical. The object to be measured (the end mill) was arranged at a predetermined positioned and in a predetermined orientation using jigs, the range from the flank face 1 to the rake face 2 was measured via the tip of the cutting edge 3 in the direction perpendicular to the cutting edge 3, the profile was detected using a laser, a circle approximating the profile was rendered, and the radius R of the cutting edge was measured. Alternatively, a portion of the object to be measured may be broken off (removed) to form a cross-section perpendicular to the cutting edge 3, and the radius R of the cutting edge in this cross-section may be measured.

Cutting Conditions

Tool: Ball end mill with single diamond-coated blade (diameter 1 mm, blade length 0.7 mm, shank diameter 4 mm, overall length 50 mm)

Cut Material: Cemented carbide VM-40 (CIS standard)

Coolant: Air blower

Tool overhand: 15 mm

Rotational speed: 30,000 min$^{-1}$

Feed rate: 150 mm/min

Axial cutting depth: 0.05 mm

Radial cutting depth: 0.25 mm

Processing: Cutting a 4.3 mm×4.3 mm×0.6 mm (L×W×D) square pocket

A test was performed on combinations of test examples in FIG. 12 under these processing conditions, and the number of pocket processing operations performed up to the end of tool life (lifespan), the size of edge chipping along the ridge line of the upper surface after creating a single pocket (length), and the occurrence of peeled coating on the rake face 2 were compared.

When the thickness h1 of the coating on the flank face 1 was μm, the thickness h2 of the coating on the rake face 2 was reduced to make the radius R of the cutting edge smaller. This had the effect of inhibiting edge chipping. However, reducing the thickness h1 of the coating on the flank face 1 reduced the tool life and the number of pockets that could be created (Test Examples 1-4).

In contrast, when the thickness h1 of the coating on the flank face 1 was 8 μm, the thickness h2 of the coating on the rake face 2 was reduced to make the radius R of the cutting edge smaller. This had the effect of inhibiting edge chipping. However, because the thickness h1 of the coating on the flank face 1 was thicker, the number of pockets that could be created before the end of the tool life was increased (Test Examples 5-9). When the thickness h2 of the coating on the rake face 2 was 6 μm after reduction, peeling of the coating on the rake face 2 during processing had a significant effect on the processed surface (Test Example 9).

When the thickness h1 of the coating on the flank face 1 was 15 μm, the thickness h2 of the coating on the rake face 2 was reduced to make the radius R of the cutting edge smaller, and this had the effect of inhibiting edge chipping. Because the thickness h1 of the coating on the flank face 1 was thicker, the number of pockets that could be created before the end of the tool life was increased. When the thickness h2 of the coating on the rake face 2 was 12 μm after reduction, there was fairly significant edge chipping, and peeling of the coating on the rake face 2 had effects such as level differences in the processed surface (Test Examples 10-13).

When the thickness h1 of the coating on the flank face 1 was 19 μm and the thickness h2 of the coating on the rake face 2 was 8 μm, the radius R of the cutting edge was 12 μm. When the diamond coating 4 was not removed on the rake face 2 side, the thickness h2 of the coating on the rake face 2 was 18 μm, and the radius R of the cutting edge was 20 μm. When the processing results were evaluated, a coating thickness h2 of 8 μm on the rake face 2 produced edge chipping with a length 10 μm, whereas the unremoved diamond coating 4 on the rake face 2 side produced edge chipping with a length 38 μm. In terms of the effect of rake face 2 peeling on the processed surfaces, a coating thickness h2 of 8 μm on the rake face 2 represented an improvement over the unremoved diamond coating 4 on the rake face 2 side (Test Examples 14, 15).

When the thickness h1 of the coating on the flank face 1 was μm, the thickness h2 of the coating on the rake face 2 was reduced to make the radius R of the cutting edge smaller. This had the effect of inhibiting edge chipping (Test Examples 16-18). By increasing the thickness h1 of the coating on the flank face 1, the radius R was larger when the diamond coating 4 on the rake face 2 side was unremoved. Therefore, the size of the radius R of the cutting edge obtained by thinning the thickness h2 of the coating on the rake face 2 was greater than when the thickness h1 of the coating on the flank face 1 was thinned. Therefore, the radius R of the cutting edge was larger even when the thickness h2 of the coating on the rake face 2 was 0.5 times the thickness h1 of the coating on the flank face 1, and the size of edge chipping and the effect of rake face 2 peeling during processing on the processed surface were somewhat greater (Test Example 18).

When the thickness h1 of the coating on the flank face 1 was 35 μm and the thickness h2 of the coating on the rake face 2 was zero, a cutting edge radius R of 15 μm was obtained, but the greater the thickness h1 of the coating on the flank face 1 caused adhesion problems with the diamond coating 4. The coating became damaged very quickly, the edge chipping was great, and the number of pockets processed before the end of the tool life was two (Test Example 20).

When the thickness h1 of the coating on the flank face 1 was 40 μm and the thickness h2 of the coating on the rake face 2 was zero, a cutting edge radius R of 18 μm was obtained. Tool damage occurred soon after the start of processing, edge chipping was significant, and the number of pockets processed before the end of the tool life was two. When a coating thickness h2 of 10 μm, 20 μm, and 24 μm remained on the rake face 2, the radius R was large, there was significant cutting resistance, and there were adhesion problems with the diamond coating 4. As a result, the number of pockets processed before the end of the tool life was zero (Test Examples 21-24).

Based on these results, the thickness h1 of the coating on the flank face 1 was established as 8 μm≤h1≤30 μm, and the relationship to the thickness h2 of the coating on the rake face 2 was established as 0≤h2/h1≤0.5 in claim 1. The radius R of the cutting edge is preferably equal to or less than a fixed ratio with respect to the thickness h1 of the coating on the flank face 1. This was established as 0.1h1≤R≤0.8h1 in claim 2. Because there are also situations in which these results cannot be obtained from a thick coating simply by using the ratio with respect to the thickness h1 of the coating of the flank face 1, 0.1h1≤R≤15 μm has also been established.

In the present embodiment, a plurality of fine ridges 6 intersecting the cutting edge 3 at an angle in a range of 90°±20° are arranged in parallel at a predetermined interval α in the diamond coating 4 on the rake face 2 at least in a region adjacent to the cutting edge 3 within a range equal to or less than 0.3 times the tool diameter in the axial direction from the tip of the tool. These ridges 6 are formed by creating a partial overlap between a groove formed by laser irradiation (irradiation mark) and the adjacent groove (see FIG. 2). More specifically, as shown in FIG. 3, this is established so as to intersect at approximately 90° the tangent line passing through the cutting edge 3 when the angle of the line intersecting the tangent line is 90°.

These ridges 6 may be formed using means other than laser irradiation. Because the shavings flow in a direction at a right angle to the cutting edge 3 during cutting, the ridges 6 are preferably formed at a right angle to the cutting edge 3 in order to control the flow of the shavings. The interval between ridges 6 was tested for differences in shavings discharge performance.

The angle conditions for the arrangement of ridges 6 in Test Example 14 in FIG. 12 were changed, and the results of this test are shown in FIG. 13. When the angle of the line intersecting the tangent line passing through the cutting edge 3 was 90°, the shavings discharge performance was good when the angle with respect to the tangent line for the ridges 6 was 90°±20°. A range of 90°±10° is preferred. In Test Example 14, it intersected the tangent line at approximately 90° as shown in FIG. 3.

In the present embodiment, the interval between ridges 6 (the laser irradiation interval) a is from 1 μm to 30 μm (see FIG. 2). The interval α between ridges 6 in Test Example 14 shown in FIG. 12 were changed, and the results of this test are shown in FIG. 14. When the cutting edge was observed, the sharpness of the cutting edge and the shavings discharge performance were good at an interval α from 0.8 μm to 40 μm. This is because the effect of the microtexture near the cutting edge provides good shaving separation and stable cutting performance.

In Test Example 14, the interval α between ridges 6 is 10 μm. When the interval α is less than 1 μm, the formation of ridges 6 is not very effective. When the interval α exceeds 30 μm, it is difficult to reduce the radius R of the cutting edge in a stable manner, and the cutting performance of the cutting edge cannot be improved. In terms of the state of the cutting edge, good results can be obtained when the interval α is 30 μm or less.

The arithmetic mean roughness Ra of the portion including the ridges 6 arranged in parallel is from 0.05 μm to 1 μm.

The arithmetic mean roughness Ra of the region in which the ridges 6 are arranged in parallel is preferably 0.05 μm or greater. When the arithmetic mean roughness Ra becomes too large, the roughness of finished surfaces becomes worse.

Therefore, it is preferably 1 μm or less. In the present embodiment, arithmetic mean roughness Ra has been established at approximately 0.5 μm. The arithmetic mean roughness Ra can be reduced by narrowing the interval α (laser irradiation interval) between ridges 6, and the arithmetic mean roughness Ra can be increased by widening the interval α. When the arithmetic mean roughness Ra is reduced, the sharpness of the cutting edge is increased. When the arithmetic mean roughness Ra is too large, the cutting edge tends to lose some sharpness.

The present invention is not limited to the single-blade ball end mill in the present embodiment. It can also be applied to a ball end mill with two or more blades, a radius end mill, or a square end mill. It may be applied to all necessary cutting edges in an end mill with two or more blades.

Also, the coating is not limited to a diamond coating. A hard coating such as a nitride-based coating may also be used.

In the configuration of the present embodiment, as described above, the thickness of the hard coating 4 on the rake face 2 near the cutting edge 3 is established at a predetermined thickness that is equal to or less than half of the thickness of the hard coating 4 ($\leq \frac{1}{2}$) on the flank face 1. In this way, the roundness of the cutting edge due to the hard coating 4 can be inhibited to obtain the desired sharpness. In other words, when the roundness of the edge of the cutting edge 3 is approximated by a circular arc having radius R in the direction perpendicular to the cutting edge 3, the radius R can be reduced sufficiently, and chipping can be inhibited.

Because a thinner hard coating 4 is less likely to peel, peeling of the hard coating 4 on the rake face 2 side can be inhibited. In other words, peeling of the hard coating 4 near the cutting edge 3 can be inhibited during finishing. Therefore, a difference does not develop in the level of the finished surface during processing, and a change in processing quality can be prevented. Also, by providing ridges 6 in the manufacturing step performed to control the thickness of the coating on the rake face 2, a more uniform cutting edge can be obtained, which promotes the discharge of shavings.

Therefore, the present embodiment provides a more practical hard-coated cutting tool with improved cutting performance during finishing so as to obtain a better finished surface.

The following is a description of test examples which corroborate the results of the embodiment.

Cutting Conditions
Tool: Ball end mill with single diamond-coated blade (diameter 1 mm, blade length 0.7 mm, shank diameter 4 mm, overall length 50 mm)
Cut Material: Cemented carbide VM-40 (CIS standard)
Coolant: Air blower
Tool overhand: 15 mm
Rotational speed: 30,000 $\text{min}^{-1}$
Feed rate: 150 mm/min
Axial cutting depth: 0.02 mm
Radial cutting depth: 0.1 mm
Finishing: Making a 5 mm×5 mm×0.02 mm (L×W×depth of axial cut) down cut in the top surface of the cut material
Direction of tool: Into the cut material from the outside in a direction perpendicular to the ridge line between the top surface and the front surface of the cut material
Evaluation: Examined for (presence or absence of) chipping on the ridge line A comparative example was manufactured under these processing conditions except that laser process was not performed on the diamond coating 4 on the rake face 2 side.

However, a similar test example underwent laser processing. Cut materials were processed using these cutting tools, and the state of the cut materials were compared after processing.

The comparative example is shown in FIG. 7 and the test example is shown in FIG. 9. In both, (a) is a photograph of the front surface, and (b) is a photograph of the side surface. FIG. 8 shows the comparative example, and FIG. 10 shows the test example. In both, (a) measurement data for the radius R of the roundness of the cutting edge in the test example, (b) a photograph of the coating from the cutting edge side, and (c) a photograph of the coating from the rake face side.

The radius R of the cutting edge of the comparative example was roughly 20.8 μm in the direction perpendicular to the blade (the direction at a right angle to the cutting edge), and the radius R of the cutting edge of the test example was roughly 13.3 μm.

Figure 1:
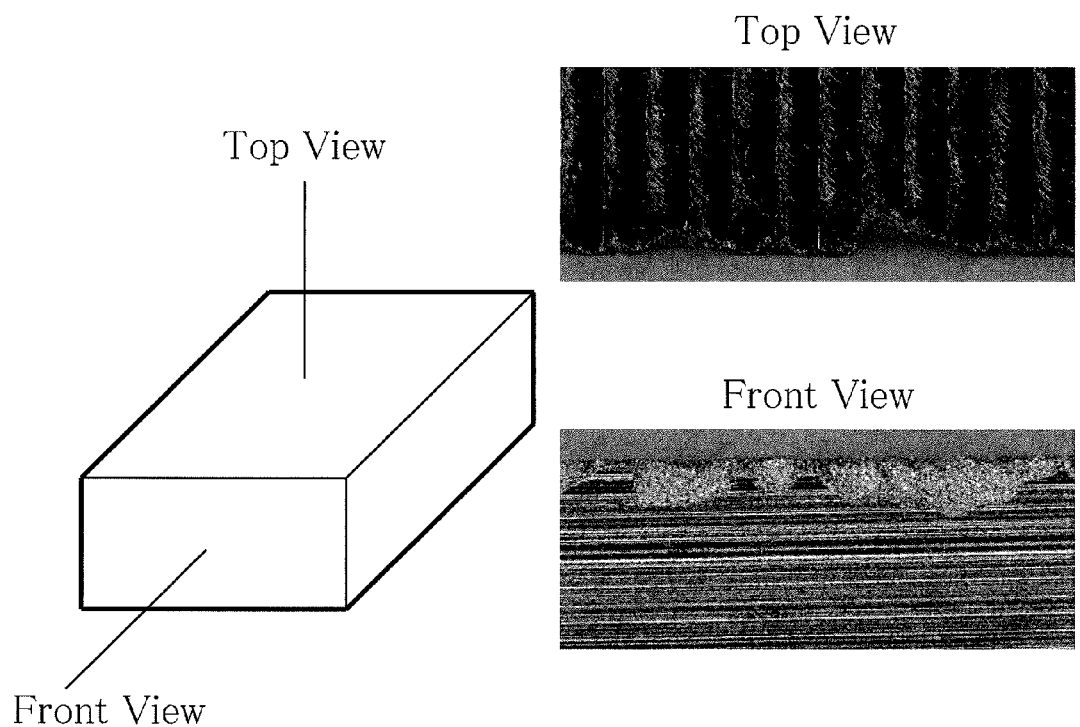
FIG. 1 shows photographs of finished surfaces of a material cut using an example of the conventional art (comparative example).
Figure 11:
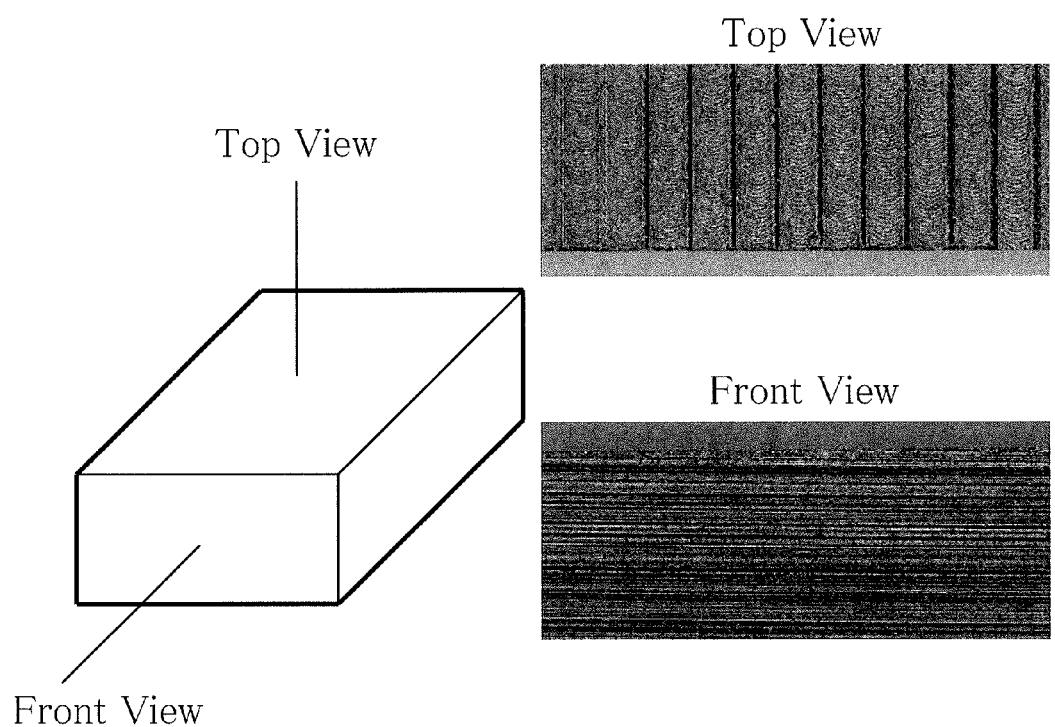
FIG. 11 shows photographs of finished surfaces of a material cut using the test example.

FIG. 1 shows photographs of the cut material after processing in the comparative example, and FIG. 11 shows photographs of the cut material after processing in the test example. It is clear from a comparison that there was no edge chipping at the start of processing and a good processed surface could be obtained when partial removal has been performed to reduce the diamond coating 4 on the rake face 2 side to a predetermined thickness, and cutting is performed using the resulting cutting edge with a smaller radius R.

The invention claimed is:

1. A hard-coated cutting tool comprising:
a tool body coated with a hard coating and comprising a cutting edge formed on a ridge line intersecting a flank face and a rake face of the tool body, wherein a thickness h1 of the hard coating on the flank face side and a thickness h2 of the hard coating on the rake face side are configured to satisy the following two conditions in a cross-section perpendicular to the cutting edge in a range equal to or less than 0.3 times the tool body diameter in an axial direction from a tip of the tool:

$$8 \text{ μm} \leq h1 \leq 30 \text{ μm; and} \quad (1)$$

$$0 \leq (h2/h1) \leq 0.5; \quad (2)$$

wherein further, when the roundness of an edge of the cutting edge is approximated by a circular arc having a radius R in a direction perpendicular to the cutting edge in a range equal to or less than 0.3 times the tool diameter in the axial direction from the tip of the tool, the following condition is satisfied:

$$(0.1)(h1) \leq R \leq (0.8)(h1).$$

2. A hard-coated cutting tool comprising:
a tool body coated with a hard coating and comprising a cutting edge formed on a ridge line intersecting a flank face and a rake face of the tool body, wherein a thickness h1 of the hard coating on the flank face side and a thickness h2 of the hard coating on the rake face side are configured to satisy the following two conditions in a cross-section perpendicular to the cutting edge in a range equal to or less than 0.3 times the tool body diameter in an axial direction from a tip of the tool:

$$8 \text{ μm} \leq h1 \leq 30 \text{ μm; and} \quad (1)$$

$$0 \leq (h2/h1) \leq 0.5; \quad (2)$$

wherein further, when the roundness of an edge of the cutting edge is approximated by a circular arc having a radius R in a direction perpendicular to the cutting edge in a range equal to or less than 0.3 times the tool diameter in the axial direction from the tip of the tool, the following condition is satisfied:

$$(0.1)(h1) \leq R \leq 15 \text{ μm} \qquad (5)$$

3. A hard-coated cutting tool comprising:

a tool body coated with a hard coating and comprising a cutting edge formed on a ridge line intersecting a flank face and a rake face of the tool body, wherein a thickness h1 of the hard coating on the flank face side and a thickness h2 of the hard coating on the rake face side are configured to satisy the following two conditions in a cross-section perpendicular to the cutting edge in a range equal to or less than 0.3 times the tool body diameter in an axial direction from a tip of the tool:

$$8 \text{ μm} \leq h1 \leq 30 \text{ μm; and} \qquad (1)$$

$$0 \leq (h2/h1) \leq 0.5; \qquad (2)$$

wherein further, a plurality of fine ridges intersecting the cutting edge at an angle in a range of 90°±20° are arranged in parallel in the hard coating of the rake face at least in a region adjacent to the cutting edge within a range equal to or less than 0.3 times the tool diameter in an axial direction from the tip of the tool.

4. The hard-coated cutting tool according to claim 1, wherein a plurality of fine ridges intersecting the cutting edge at an angle in a range of 90°±20° are arranged in parallel in the hard coating of the rake face at least in a region adjacent to the cutting edge within a range equal to or less than 0.3 times the tool diameter in the axial direction from the tip of the tool.

5. The hard-coated cutting tool according to claim 2, wherein a plurality of fine ridges intersecting the cutting edge at an angle in a range of 90°±20° are arranged in parallel in the hard coating of the rake face at least in a region adjacent to the cutting edge within a range equal to or less than 0.3 times the tool diameter in the axial direction from the tip of the tool.

6. The hard-coated cutting tool according to claim 3, wherein the interval between the ridges arranged in parallel is from 1 μm to 30 μm.

7. The hard-coated cutting tool according to claim 4, wherein the interval between the ridges arranged in parallel is from 1 μm to 30 μm.

8. The hard-coated cutting tool according to claim 5, wherein the interval between the ridges arranged in parallel is from 1 μm to 30 μm.

9. The hard-coated cutting tool according to claim 6, wherein an arithmetic mean roughness Ra of a portion of the cutting tool comprising the ridges arranged in parallel is from 0.05 μm to 1 μm.

10. The hard-coated cutting tool according to claim 7, wherein an arithmetic mean roughness Ra of a portion of the cutting tool comprising the ridges arranged in parallel is from 0.05 μm to 1 μm.

11. The hard-coated cutting tool according to claim 8, wherein an arithmetic mean roughness Ra of a portion of the cutting tool comprising the ridges arranged in parallel is from 0.05 μm to 1 μm.

12. The hard-coated cutting tool according to claim 9, wherein the ridges are formed by removing a portion of the surface of the hard coating on the rake face adjacent to the cutting edge using a laser.

13. The hard-coated cutting tool according to claim 10, wherein the ridges are formed by removing a portion of the surface of the hard coating on the rake face adjacent to the cutting edge using a laser.

14. The hard-coated cutting tool according to claim 11, wherein the ridges are formed by removing a portion of the surface of the hard coating on the rake face adjacent to the cutting edge using a laser.

15. The hard-coated cutting tool according to claim 12, wherein the hard coating is a diamond coating.

16. The hard-coated cutting tool according to claim 13, wherein the hard coating is a diamond coating.

17. The hard-coated cutting tool according to claim 14, wherein the hard coating is a diamond coating.

* * * * *

UNITED STATES PATENT AND TRADEMARK OFFICE
CERTIFICATE OF CORRECTION

PATENT NO. : 9,868,160 B2
APPLICATION NO. : 14/507294
DATED : January 16, 2018
INVENTOR(S) : Hideki Osaki et al.

It is certified that error appears in the above-identified patent and that said Letters Patent is hereby corrected as shown below:

Column 4, Line 16, change "cutting edge" to --cutting edge (3)--;

Column 6, Line 55, change "was μm" to --was 5 μm--;

Column 7, Line 33, change "was μm" to --was 30 μm--;

Column 8, Line 45, change "a" to --α--.

Signed and Sealed this
Ninth Day of October, 2018

Andrei Iancu
*Director of the United States Patent and Trademark Office*